United States Patent
Alwan et al.

(10) Patent No.: US 8,472,922 B2
(45) Date of Patent: Jun. 25, 2013

(54) ENHANCED COMMUNICATIONS LOG FOR A MOBILE COMMUNICATIONS DEVICE

(75) Inventors: Charbel S. Alwan, Research Triangle Park, NC (US); Hugh E. Hockett, Raleigh, NC (US); Brian T. Pegram, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 12/785,719

(22) Filed: May 24, 2010

(65) Prior Publication Data

US 2011/0287745 A1 Nov. 24, 2011

(51) Int. Cl.
*H04L 12/58* (2006.01)

(52) U.S. Cl.
USPC ............................... 455/412.1; 455/412.2

(58) Field of Classification Search
USPC ............................................... 455/412.1, 412.2
See application file for complete search history.

(56) References Cited

U.S. PATENT DOCUMENTS

| | | | |
|---|---|---|---|
| 7,542,558 B2 | 6/2009 | Klein et al. | |
| 2002/0098831 A1 | 7/2002 | Castell et al. | |
| 2003/0055908 A1 | 3/2003 | Brown et al. | |
| 2005/0201362 A1 | 9/2005 | Klein et al. | |
| 2006/0002536 A1 | 1/2006 | Ambrose | |
| 2006/0025112 A1* | 2/2006 | Hamanaga et al. | 455/412.1 |
| 2008/0069317 A1 | 3/2008 | Campbell et al. | |
| 2009/0047933 A1 | 2/2009 | Spitzer | |
| 2009/0170480 A1 | 7/2009 | Lee | |
| 2009/0209286 A1 | 8/2009 | Bentley et al. | |
| 2009/0264158 A1* | 10/2009 | Bocking | 455/566 |
| 2010/0151831 A1* | 6/2010 | Hao et al. | 455/412.2 |
| 2011/0195691 A9* | 8/2011 | Maguire et al. | 455/412.1 |

OTHER PUBLICATIONS

"Method to Display Callee Status on Mobile Phones and Hand Held Devices," IBM Corporation, IP.com Technical Disclosure Bulletin, IPCOM000174528D, Sep. 12, 2008.
"Halfbakery: Cell Phone Away Message," [online] reviewed by TheDish, Sep. 4. 2006, [retrieved Apr. 29, 2010] retrieved from the Internet: <http://www.halfbakery.com/idea/Cell_20Phone_20Away_20Message>.
"Cell Phone Away Message," [online] Why?Not.com, original posting by em79, Jan. 23, 2007 [retrieved Apr. 29, 2010] retrieved from the Internet: <http://www.whynot.net/ideas/3242>.

* cited by examiner

*Primary Examiner* — Kamran Afshar
*Assistant Examiner* — Sayed T Zewari
(74) *Attorney, Agent, or Firm* — Patents on Demand, P.A.; Brian K. Buchheit; Scott M. Garrett

(57) ABSTRACT

A set of context incidents can be logged for a mobile communication device. Communication incidents to and from the mobile communication device can also be logged. The context data can be associated with the communication incidents. One or more of the context incidents can be associated with a set of different ones of the communication incidents. A call log window can be displayed upon a screen of the mobile communication device. The call log window can include a listing showing at least a portion of the communication incidents and an associated context incident.

20 Claims, 4 Drawing Sheets

ENHANCED COMMUNICATIONS LOG FOR A MOBILE COMMUNICATIONS DEVICE

BACKGROUND

The present invention relates to the field of mobile communications devices and, more particularly, to an enhanced communications log for a mobile communications device.

Mobile communications have become a vital component of daily life. Using various mobile communications devices, a user is able to talk to/chat with friends, answer emails, and/or browse the Internet from almost anyplace visited. As such, users can encounter a variety of issues keeping track of the large volume of communications that transpire upon their mobile communications device.

The more types of communication supported by the mobile communications device, the more time a user must spend to individually examine the communication data or log for each communication component. That is, the user must access the phone component to look up who has called recently, the text messaging component for recent text messages, and so on. Since these logs are accessed separately, the user is unable to visualize the chronological relationship between various communications (i.e., was the text message sent before or after the phone call was missed).

Further, the logs kept by mobile communications devices tend to overlook important operating conditions that influence how the device is able to process the communications. Sometimes a user misses a phone call while away from their mobile phone, but a phone call can also be missed because the mobile phone is in an area of "No Service". Conventional phone logs do not make a distinction between calls missed in either of these fashions, nor is an operating context of the mobile communications device provided.

SUMMARY

In the disclosure, a set of context incidents can be logged for a mobile communication device. Communication incidents to and from the mobile communication device can be logged. The context incident can be associated with a set of related communication incidents. One or more context incidents can be associated with different ones of the communication incidents. A call log window can be displayed upon a screen of the mobile communication device. The call log window can include a listing showing at least a portion of the communication incidents and an associated context incident.

The disclosure can be implemented as a method, as a computer program product, as a device, and as a system, depending on implementation specifics. The computer program product can be stored in a non-transient, tangible storage medium. The computer program product can include computer usable or readable code that is executable by one or more processor. The computer program product can be implemented in software, firmware, or even hard-wired within electronic circuitry. The system can include a processor, a volatile memory, a non-volatile memory, a network transceiver, and other such components interconnected via a bus. The processor can execute the computer program product, which can be stored in the non-volatile or volatile memory.

DETAILED DESCRIPTION

Figure 1:
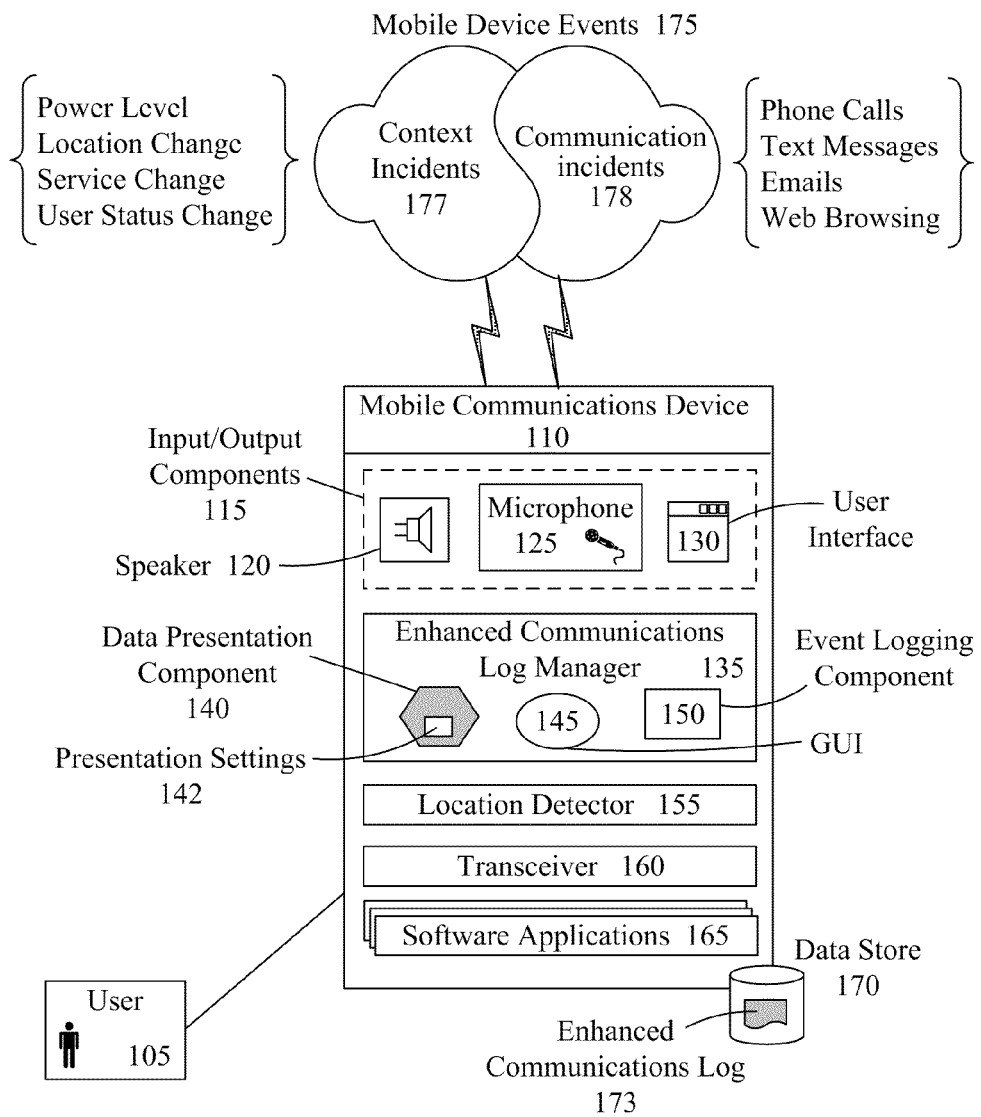
FIG. 1 is a schematic diagram illustrating a system for providing a user with an enhanced communications log for a mobile communications device in accordance with embodiments of the inventive arrangements disclosed herein.

The present invention discloses a solution that presents a user with an enhanced communications log for a mobile communications device. An enhanced communications log manager operating upon the mobile communications device can capture context incidents of the mobile communications device in addition to communication incident s to comprise the enhanced communications log. The enhanced communications log manager can then present the enhanced communications log to the user in accordance to user-configured presentation settings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a system 100 for providing a user 105 with an enhanced communications log 173 for a mobile communications device 110 in accordance with embodiments of the inventive arrangements disclosed herein. In system 100, an enhanced communications log manager 135 can capture mobile device events 175 for a mobile communications device 110 that occur over time and with use.

The mobile communications device 110 can represent a variety of electronic devices capable of exchanging data over a mobile or cellular data network (not shown). The mobile communications device 110 can be configured to handle one or more types of data communications. Examples of mobile communications devices 110 can include, but are not limited to, mobile phones, smart phones, personal data assistants (PDAs), mobile messaging devices, mobile email devices, and the like.

The mobile communications device 110 or system 100 can include input/output components 115, the enhanced communications log manager 135, a location detector 155, a transceiver 160, one or more software applications 165, and a data store 170 containing an enhanced communications log 173. The transceiver 160 can allow the mobile communications device 110 to communicate over the associated data network. Although a mobile communication device 110 is listed and detailed herein, the enhanced call log can also be implemented within a context of a customer premise equipment (CPE) device not considered a mobile device, such as a VOIP phone, a switching station, software linked to a communication system, or a other such device or system that maintains a call log.

The location detector 155 can represent a component configured to determine the current geographical location of the mobile communications device 110. The location detector 155 can utilize a variety of techniques including, but not limited to, a global positioning system, signal triangulation, mobile phone tracking, mobile positioning, radio-frequency identification (RFID), and the like. The current geographical location of the mobile communications device 110 can affect the operation of the mobile communications device 110, such as signal strength and the type of available service (e.g., in-network, roaming, no service, etc.).

The input/output components 115 can represent the components of the mobile communications device 110 that can receive input data from/provide output data to the user 105.

As shown in system 100, the input/output components 115 can include a speaker 120, microphone 125, and user interface 130. The speaker 120 and microphone 125 can be used to capture and present data of an audio format, such as when the user 105 is engaged in a phone conversation.

The user interface 130 can represent other elements that allow the user 105 to interact with the mobile communications device 110. The type of elements included in the user interface 130 can vary based upon the type of mobile communications device 110. For example, a mobile phone 110 with a typical user interface 130 would have a display and number pad of tactile buttons, whereas a mobile phone 110 with a touch-based user interface 130 would only have a touch-sensitive display.

The user interface 130 can be used in conjunction with the various software applications 165 operating on the mobile communications device 110. The software applications 165 can represent various software programs configured to operate upon and provide functionality for the mobile communications device 110. Examples of software applications 165 can include, but are not limited to, an operating system, an email application, a text messaging application, an instant messaging application, a music player, a video player, and the like.

The enhanced communications log manager 135 can represent a specialized software application 165 configured to aggregate data regarding mobile device events 175 experienced by the mobile communications device 110 into an enhanced communications log 173. A mobile device event 175 can represent a change in one or more operating conditions of the mobile communications device 110 that can be recognized by the enhanced communications log manager 135. Mobile device events 175 can be classified as context incidents 177 or communication incidents 178. In one embodiment, the manager 135 and/or functionality therein can be implemented remote from device 110, such as within a Web server, a software service, or server-based application code.

A context incident 177 can represent a change in a condition of the operating environment of the mobile communications device 110. Conditions encompassed by context incidents 177 can include, but are not limited to, power level, device location, service type, user status, ring tone, and the like. Changes to these conditions can occur in response to an action of the user 105, as with changing a ring tone, or automatically, as with the type of service (e.g., in-network, roaming, etc.) provided to the mobile communications device 110.

A communication incident 178 can represent an event related to the voice/data exchanges of the mobile communications device 110 with other communications devices (e.g., another mobile phone, a Web site, a network server, etc.). Examples of communication incident 178 can include, but are not limited to, phone calls, text messages, emails, Internet traffic (i.e., streaming audio/video, file downloads, Web browsing, etc.), and the like.

The enhanced communications log manager 135 can utilize an event logging component 150 to capture data regarding mobile device events 175. The enhanced communications log manager 135 can be configured to allow the user 105 to customize the details captured by the event logging component 150 for a mobile device event 175. Each event 175 can be events occurring external to device 110, ones occurring internal device 110, ones detected with sensors of the device 110, and ones that are detected remote from the device 110. Remote events 175 can be communicated to the device 110 (or to log manager 135 where ever it is implemented) via information digitally encoded within carrier waves (e.g., messages can be exchanged over a network that include event data).

In addition to the time and date when a mobile device event 175 occurs, the user 105 may wish to know the location of the mobile communications device 110. Thus, the event logging component 150 would request location information from the location detector 155 when capturing mobile device event 175 data.

The event logging component 150 can store the captured mobile device event 175 data in the data store 170 as the enhanced communications log 173. When the user 105 wants to view the contents of the enhanced communications log 173, the data presentation component 140 of the enhanced communications log manager 135 can be invoked.

The data presentation component 140 can be configured to access and visually present data of the enhanced communications log 173 within a graphical user interface (GUI) 145 of the enhanced communications log manager 135. Other interfaces, such as a voice user interface (VUI) and a text user interface (TUI) can be used in place of and/or in addition to a graphical user interface (GUI) 145. Presentation of the enhanced communications log 173 within the GUI 145 can be performed in accordance with user-configurable presentation settings 142. The presentation settings 142 can define the ordering and/or grouping of the enhanced communications log 173 data being presented as well as data filters to be applied.

For example, the user 105 can indicate in the presentation settings 142 that they desire to have certain mobile device events 175 omitted from the presentation of the enhanced communications log 173. In another example, a typical phone log is often presented chronologically without regard to any other criteria. Using the presentation settings 142, the user 105 can specify that the data of the enhanced communications log 173 should be primarily grouped by service type. By doing so, the user 105 can view a history of missed calls while the mobile communications device 110 was in an area of "No Service", "Roaming Service", and/or any other service type of the data network.

The data presentation component 140 can be further configured to organize and present the enhanced communications log 173 data within a hierarchical structure such as a tree. This means of organization can illustrate superior/subordinate relationships between both the groupings defined in the presentation settings 142 and the mobile device events 175.

Expanding upon the previous example, the tree structure of the enhanced communications log 173 could include main branches corresponding to each service type with the mobile device events 175 that occurred during that service type nested underneath. Additional organization can be expressed in the tree structure as sub-groupings. For example, different sortable/organization settings can be used to construct different hierarchical trees, each having subordinate and superior nodes. For instance, enhanced communication log 173 can be organized in communication incidents, user status, user name, communication type, communication thread, and the like. In one embodiment, the tree structures can be rooted trees.

It is important to note that a history of communication incident s 178 is often maintained among their associated components of the mobile communications device 110. That is, the component that sends/receives phone calls records a log of phone calls, the text messaging component logs sent/received text messages, the email component provides access to stored emails, and a Web browser keeps a browsing history.

Under this conventional approach to logging communication incidents 178, the user 105 must view each log separately and without relation to each other. A user 105 viewing a phone log must close the phone log before accessing a text message log. As such, the user 105 cannot easily visualize the chronological relationship between phone calls and text messages. Further, the user interface 130 of most mobile communications devices 110 cannot support viewing both logs simultaneously.

Additionally, this conventional approach disregards the context that can be provided by context incidents 177. If the mobile communications device 110 records the occurrence of context incidents 177, the user 105 cannot often access the recorded data easily; additional software applications 165 and technical knowledge can be required.

For example, the phone logs of many mobile communications device 110 simply indicate that the user 105 missed a call. The user 105 can then be left to determine the reason the call was missed. While the user 105 is typically aware when they are at fault for the missed call (i.e., did not answer in time), the user 105 may not be aware of other operating conditions of the mobile communications device 110 that may have caused the missed call, such as signal strength or service type (i.e., the mobile communications device 110 was operating in an area of "No Service"). Further, a user's memory can fade over time, so even the user's awareness of conditions may not be properly correlated by a user at the time he/she examines call log information. This is part of the nature of a call log, which is intended to assist a user in organizing large quantities of data so that it can be digested quickly and intuitively, thus enhancing a user's experience.

The enhanced communications log manager 135 and enhanced communications log 173 can overcome these shortcomings by providing the means to present a unified log of all types of communication incidents 178 supported by the mobile communications device 110 with the context provided by context incidents 177. That is, the user 105 can view information about all types of mobile device events 175 in one customizable presentation.

As such, the enhanced communications log 173 can provide the user 105 with a user-friendly means to examine operation of their mobile communications device 110. For example, the user 105 can identify "dead zones" (i.e., areas without service) encountered during their daily travel. The user 105 can then adjust their travel route for better service coverage.

As used herein, presented data store 170 can be a physical or virtual storage space configured to store digital information. Data store 170 can be physically implemented within any type of hardware including, but not limited to, a magnetic disk, an optical disk, a semiconductor memory, a digitally encoded plastic memory, a holographic memory, or any other recording medium. Data store 170 can be a stand-alone storage unit as well as a storage unit formed from a plurality of physical devices. Additionally, information can be stored within data store 170 in a variety of manners. For example, information can be stored within a database structure or can be stored within one or more files of a file storage system, where each file may or may not be indexed for information searching purposes. Further, data store 170 can utilize one or more encryption mechanisms to protect stored information from unauthorized access.

Figure 2:
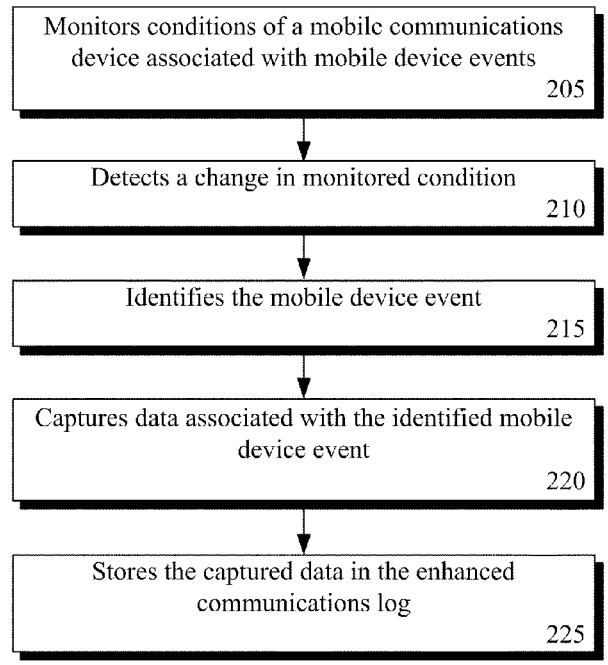
FIG. 2 is a flow chart of a method describing the capture of mobile device events by an enhanced communications log manager in accordance with an embodiment of the inventive arrangements disclosed herein.

FIG. 2 is a flow chart of a method 200 describing the capture of mobile device events by an enhanced communications log manager in accordance with embodiments of the inventive arrangements disclosed herein. Method 200 can be performed within the context of system 100 or another system configured to capture mobile device events. The steps of method 200 can be performed by the event logging component of the enhanced communications log manager.

Method 200 can begin in step 205 where the enhanced communications log manager can monitor the conditions of a mobile communications device that are associated with mobile device events. In step 210, a change in a monitored condition can be detected.

The mobile device event can be identified by the enhanced communications log manager in step 215. In step 220, data associated with the identified mobile device event can be captured. The captured data can be stored in the enhanced communications log in step 225.

Figure 3:
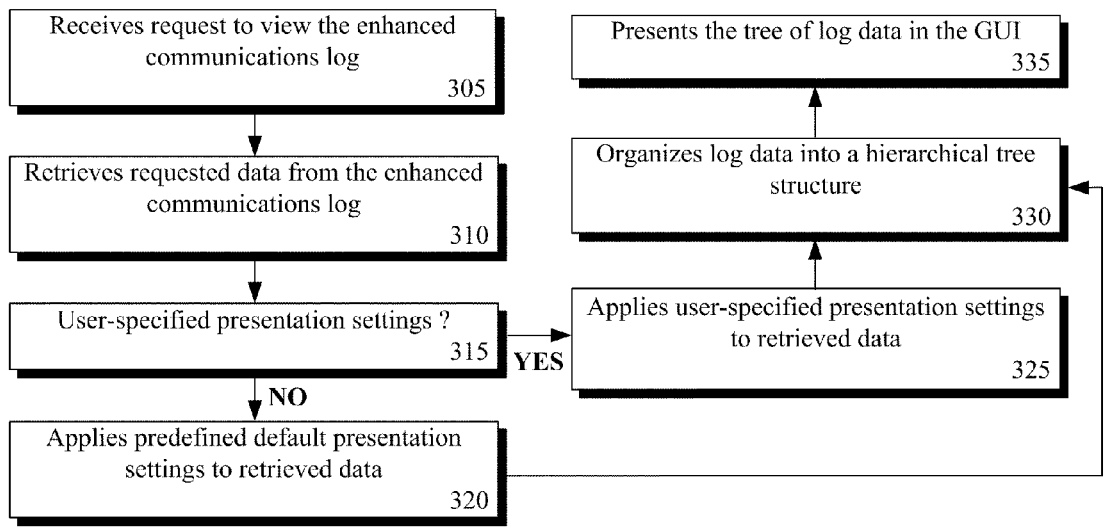
FIG. 3 is a flow chart of a method describing the presentation of an enhanced communications log by the enhanced communications log manager in accordance with an embodiment of the inventive arrangements disclosed herein.

FIG. 3 is a flow chart of a method 300 describing the presentation of an enhanced communications log by the enhanced communications log manager in accordance with embodiments of the inventive arrangements disclosed herein. Method 300 can be performed within the context of system 100 and/or in conjunction with method 200. The steps of method 300 can be performed by the data presentation component of the enhanced communications log manager.

Method 300 can begin in step 305 where the enhanced communications log manager can receive a request to view the enhanced communications log. In step 310, the requested data can be retrieved from the enhanced communications log. The existence of user-specified presentation settings can be determined in step 315.

When user-specified presentation settings do not exist, the enhanced communications log manager can apply predefined default presentation settings to the retrieved data in step 320. When user-specified presentation settings do exist, step 325 can execute where the enhanced communications log manager applies the user-specified presentation settings to the retrieved data.

Upon completion of step 320 or 325, step 330 can be performed where the enhanced communications log manager can organize the log data into a hierarchical tree structure. In step 335, the tree of log data can be presented within the graphical user interface (GUI) of the enhanced communications log manager.

Figure 4:
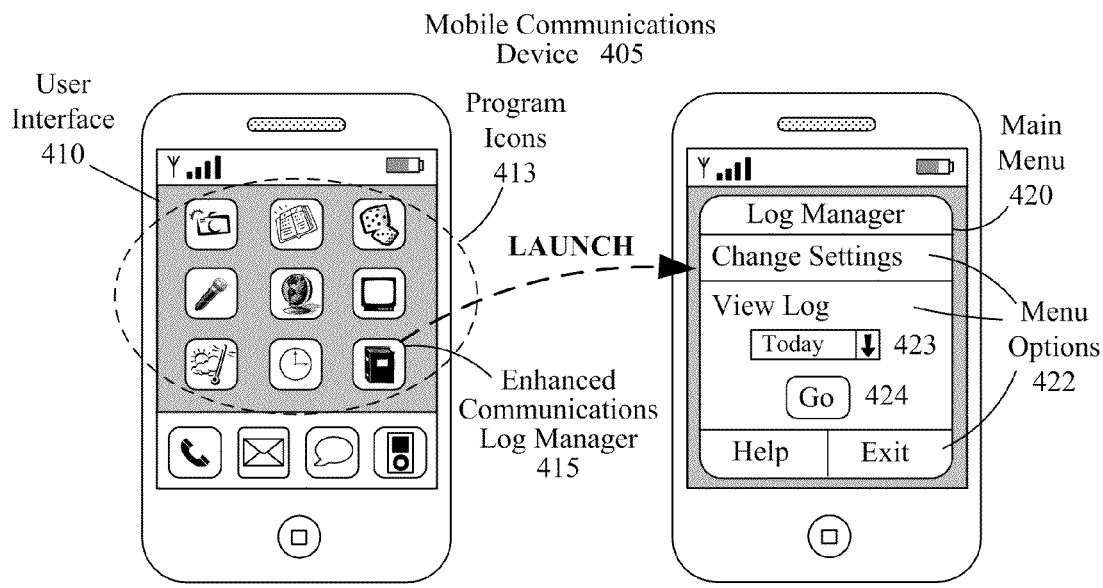
FIG. 4 is a collection of mobile communications device graphical user interfaces (GUIs) illustrating a sample implementation of the enhanced communications log manager in accordance with an embodiment of the inventive arrangements disclosed herein.

FIG. 4 is a collection 400 of mobile communications device 405 graphical user interfaces (GUIs) illustrating a sample implementation of the enhanced communications log manager in accordance with embodiments of the inventive arrangements disclosed herein. The GUIs shown in FIG. 4 can be utilized within the context of system 100 and/or in conjunction with methods 200 and/or 300.

Figure 4A:
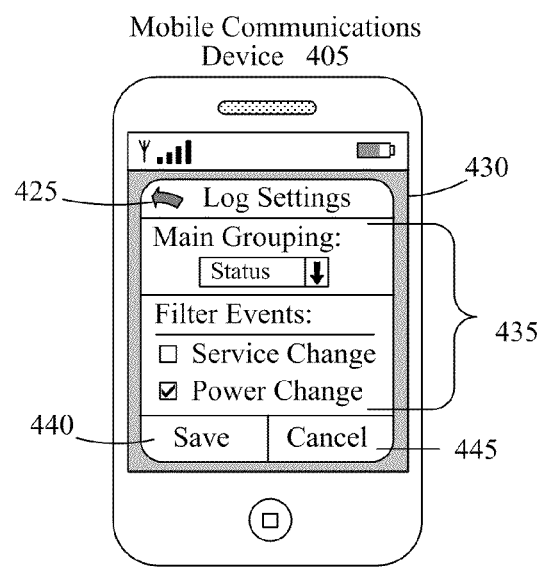
FIG. 4A illustrates a sample GUI for configuring the parameter settings of the enhanced communications log manager.
Figure 4B:
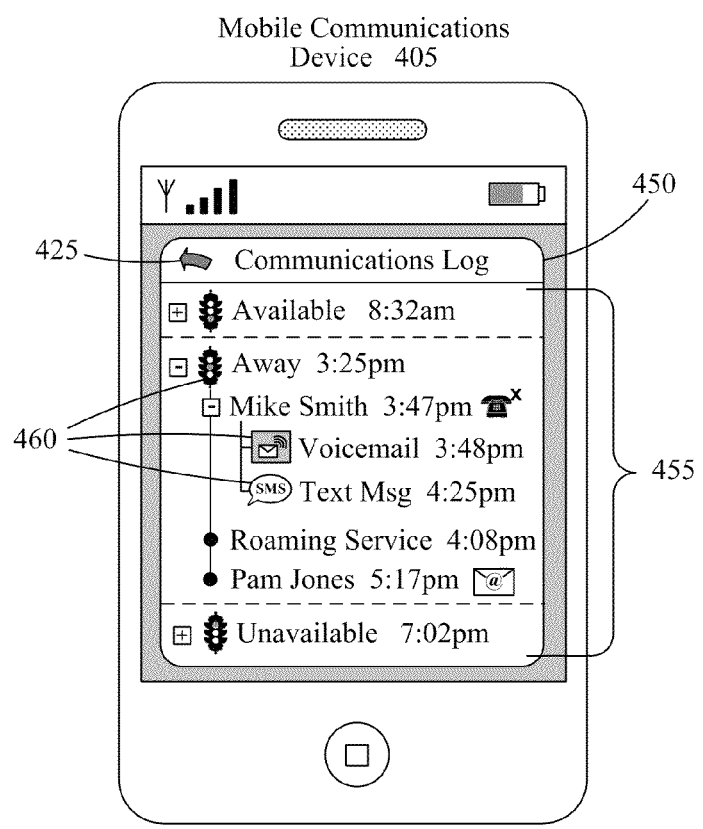
FIG. 4B illustrates a sample presentation of the enhanced communications log.

It should be appreciated that the GUIs presented in FIGS. 4, 4A, and 4B are for illustrative purposes only, and that additional configurations and functionalities can be incorporated without diverging from this embodiment of the present invention.

In collection 400, the mobile communications device 405, and touch interface in this example, can provide access to the enhanced communications log manager 415 via a specialized program icon 413. The program icons 413 can be presented to the user within the user interface 410 of the mobile communications device 405.

The program icons 413 can represent software applications and/or services installed upon the mobile communications device 405. Selection of the program icon 413 representing the enhanced communications log manager 415 can result in the display of the main menu 420.

The main menu 420 can present the user with various menu options 422. As shown in this example, the menu options 422 of the main menu 420 can include a change settings option, a view log option, a help menu option, and an exit application option. As expected, selection of the help menu option 422 can present the user with a variety of helpful information for using the enhanced communications log manager 415. The user can close the enhanced communications log manager 415 via the exit application option 422 of the main menu 420.

Selection of the change settings option 422 can present the user with a GUI similar to the log settings interface 430 of FIG. 4A. The log settings interface 430 can include one or more configurable log parameters 435, a back button 425, a save button 440, and a cancel button 445.

The configurable log parameters 435 can represent the means by which the user can organize and/or modify the presentation of data in the enhanced communications log. As shown in this example, the configurable log parameters 435 can allow the user to set what data field is used as the main grouping for the enhanced communications log data and the types of mobile device event data that should be omitted from the presentation of the enhanced communications log.

The save button 440 can initiate the storage of the configurable log parameters 435 as parameter settings for the enhanced communications log manager. Selection of the cancel button 445 can discard any changes made to the configurable log parameters 435 and return the user to the main menu 420. Likewise, the back button can be selected to navigate to the main menu 420 without saving changes made to the configurable log parameters 435.

The view log option 422 of the main menu 420 can include a time period selector 423 to allow the user to specify a time span for which the data of the enhanced communications log should reflect. Selection of the go button 424 from the view log option 422 can present the user with a GUI such as the communications log interface 450 shown in FIG. 4B.

The communications log interface 450 can present the data of the enhanced communications log in an expandable/collapsible tree structure 455 reflecting the values of the configurable log parameters 435. The communications log interface 450 can also utilize the back button 425 to return to the main menu 420.

In this example, the data of the enhanced communications log is grouped by a user status such as the status used in many instant messaging or social networking applications. A variety of graphical icons 460 can be utilized to provide a visual cue for the associated data record.

The expanded section of the communications log tree 455 can indicate that the user set their status to "Away" at 3:25 pm. At 3:47 pm, the user missed a phone call from Mike Smith, who left a voicemail at 3:48 pm and sent a text message at 4:25 pm. The mobile communications device 405 switched to a roaming service area at 4:08 pm, and an email from Pam Jones was received at 5:17 pm.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing call logs for a communication device comprising:
   logging a plurality of context incidents for a mobile communication device, wherein the context incident represents a change in an operating environment condition of the mobile communication device;
   logging communication incidents to and from the mobile communication device;
   associating the context incidents with the communication incidents, wherein at least one of the context incidents is associated with a plurality of different ones of the communication incidents; and
   displaying a call log window upon a screen of the mobile communication device, wherein the call log window comprises a listing showing at least a portion of the logged communication incidents and associated ones of the context incidents for each of the shown communication incidents.

2. The method of claim 1, wherein one type of context incident indicates a user's availability status, which is a user established setting of the mobile communication device, wherein user availability status comprises status used in at least one of the instant messaging or social networking applications, wherein at least a portion communication incidents shown in the listing show a user's availability status corresponding to each of the communication incidents.

3. The method of claim 1, wherein one type of context incident indicates a location of the mobile device, wherein at least a portion of the communication incidents shown in the listing show the location of the mobile device that corresponds to each of the communication incidents.

4. The method of claim 1, wherein one type of context incident indicates a connectivity state of the mobile communication device, wherein at least a portion of the communication incidents shown in the listing show the connectivity state of the mobile device that corresponds to each of the communication incidents.

5. The method of claim 1, wherein one type of context incident indicates a power state of the mobile communication device, wherein at least a portion of the communication incidents shown in the listing show the power state of the mobile device that corresponds to each of the communication incidents.

6. The method of claim 1, wherein one type of context incident indicates a ring state of the mobile communication device, wherein ring state indicates a selected ring tone of the mobile communication device, wherein at least a portion of the communication incidents shown in the listing show the ring state of the mobile device that corresponds to each of the communication incidents.

7. The method of claim 1, further comprising:
   detecting a change in a device state, wherein before the change the mobile communication device is unable to receive mobile communications over a network and wherein after the change the mobile communication device is able to receive mobile communications over the network; and
   automatically presenting the call log window responsive to the change in the device state without receiving an explicit user selection to present the call log window, wherein the listing shows a subset of communication incidents each being an incoming communication attempt that occurred when the device was in a previous device state existent before said change, wherein each of the incoming communication were not presented earlier due to the mobile communication device being unable to receive mobile communications over the network.

8. The method of claim 1, further comprising:
organizing the listing as a hierarchy of nodes, each node able to be expanded and contracted, wherein a plurality of the communication incidents are grouped under at least a portion of the nodes, and are hidden within the call log window when the corresponding node is contracted and are shown in the call log window when the corresponding node is expanded.

9. The method of claim 8, wherein each of the nodes represents one of the context incidents, wherein the different ones of the communication incidents associated with each of the context incidents are grouped as sub nodes under the corresponding node.

10. The method of claim 1, wherein one type of context incident indicates a user's availability status, which is a user established setting of the mobile communication device, wherein at least a portion communication incidents shown in the listing show a user's availability status corresponding to each of the communication incidents, wherein user availability status comprises status used in at least one of the instant messaging or social networking applications, said method further comprising:
organizing the listing as a hierarchy of nodes, each node able to be expanded and contracted, wherein a plurality of the communication incidents are grouped under at least a portion of the nodes, and are hidden within the call log window when the corresponding node is contracted and are shown in the call log window when the corresponding node is expanded, wherein a top level of nodes in the hierarchy of nodes is associated with the user's availability status.

11. The method of claim 1, wherein the communication incidents comprise phone calls, text messages, email messages, and Web browsing incidents.

12. The method of claim 1, wherein the context incidents comprise power state change incidents, location change incidents, service state change incidents, and user status change incidents.

13. A computer program product comprising a non-transitory computer readable storage medium having computer usable program code embodied therewith, the computer usable program code comprising:
computer usable program code stored in a non-transitory storage medium, when said computer usable program code is executed by a processor it is operable to log a plurality of context incidents for a mobile communication device, wherein the context incident represents a change in an operating environment condition of the mobile communication device;
computer usable program code stored in a non-transitory storage medium, when said computer usable program code is executed by a processor it is operable to log communication incidents to and from the mobile communication device;
computer usable program code stored in a non-transitory storage medium, when said computer usable program code is executed by a processor it is operable to associate the context incidents with the communication incidents, wherein at least one of the context incidents is associated with a plurality of different ones of the communication incidents; and
computer usable program code stored in a non-transitory storage medium, when said computer usable program code is executed by a processor it is operable to display a call log window upon a screen of the mobile communication device, wherein the call log window comprises a listing showing at least a portion of the logged communication incidents and associated ones of the context incidents for each of the shown communication incidents.

14. The computer program product of claim 13, further comprising:
computer usable program code stored in a non-transitory storage medium, when said computer usable program code is executed by a processor it is operable to detect a change in a device state, wherein before the change the mobile communication device is unable to receive mobile communications over a network and wherein after the change the mobile communication device is able to receive mobile communications over the network; and
computer usable program code stored in a non-transitory storage medium, when said computer usable program code is executed by a processor it is operable to automatically present the call log window responsive to the change in the device state without receiving an explicit user selection to present the call log window, wherein the listing shows a subset of communication incidents each being an incoming communication attempt that occurred when the device was in a previous device state existent before said change, wherein each of the incoming communication were not presented earlier due to the mobile communication device being unable to receive mobile communications over the network.

15. The computer program product of claim 13, further comprising:
computer usable program code stored in a non-transitory storage medium, when said computer usable program code is executed by a processor it is operable to organize the listing as a hierarchy of nodes, each node able to be expanded and contracted, wherein a plurality of the communication incidents are grouped under at least a portion of the nodes, and are hidden within the call log window when the corresponding node is contracted and are shown in the call log window when the corresponding node is expanded.

16. A mobile communication device comprising:
a transceiver for communicating between the mobile communication device and a network;
a data store that is a tangible storage medium upon which a communications log manager is stored;
a screen for visually displaying information; and
a processor operable to execute programmatic instructions of the communication log manager, wherein execution of the communications log manager by the processor causes the mobile communication device to:
log a plurality of context incidents for a mobile communication device, wherein the context incident represents a change in an operating environment condition of the mobile communication device;
log communication incidents to and from the mobile communication device;
associate the context incidents with the communication incidents, wherein at least one of the context incidents is associated with a plurality of different ones of the communication incidents; and
display a call log window upon a screen of the mobile communication device, wherein the call log window comprises a listing showing at least a portion of the logged communication incidents and associated ones of the context incidents for each of the shown communication incidents.

17. The mobile communication device of claim 16, wherein the communication incidents comprise phone calls, text messages, email messages, and Web browsing incidents.

18. The mobile communication device of claim 16, wherein the context incidents comprise power state change incidents, location change incidents, service state change incidents, and user status change incidents.

19. The mobile communication device of claim 16, wherein execution of the communications log manager by the processor causes the mobile communication device to:
   detect a change in a device state, wherein before the change the mobile communication device is unable to receive mobile communications over a network and wherein after the change the mobile communication device is able to receive mobile communications over the network;
   automatically present the call log window responsive to the change in the device state without receiving an explicit user selection to present the call log window, wherein the listing shows a subset of communication incidents each being an incoming communication attempt that occurred when the device was in a previous device state existent before said change, wherein each of the incoming communication were not presented earlier due to the mobile communication device being unable to receive mobile communications over the network.

20. The mobile communication device of claim 16, wherein one type of context incident indicates a user's availability status, which is a user established setting of the mobile communication device, wherein at least a portion communication incidents shown in the listing show a user's availability status corresponding to each of the communication incidents, wherein user availability status comprises status used in at least one of the instant messaging or social networking applications, wherein execution of the communications log manager by the processor causes the mobile communication device to:
   organize the listing as a hierarchy of nodes, each node able to be expanded and contracted, wherein a plurality of the communication incidents are grouped under at least a portion of the nodes, and are hidden within the call log window when the corresponding node is contracted and are shown in the call log window when the corresponding node is expanded, wherein a top level of nodes in the hierarchy of nodes is associated with the user's availability status.

* * * * *